J. A. PINDELL.
FRUIT PICKER.
APPLICATION FILED MAR. 28, 1913.
1,105,302.
Patented July 28, 1914.
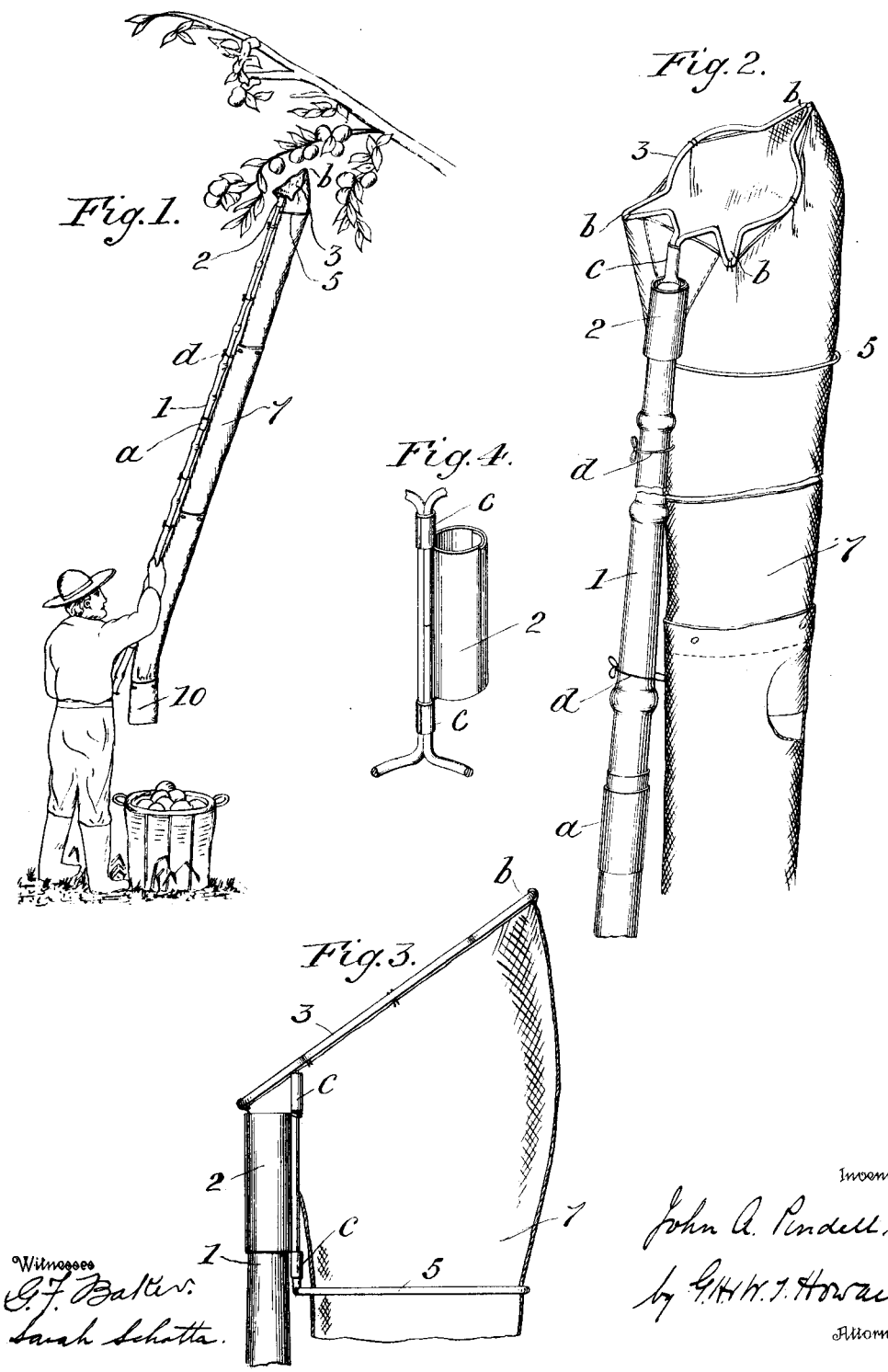

UNITED STATES PATENT OFFICE.

JOHN A. PINDELL, OF COCKEYSVILLE, MARYLAND.

FRUIT-PICKER.

1,105,302.  Specification of Letters Patent.  Patented July 28, 1914.

Application filed March 28, 1913. Serial No. 757,289.

*To all whom it may concern:*

Be it known that I, JOHN A. PINDELL, a citizen of the United States, residing at Cockeysville, Maryland, have invented certain Improvements in Fruit-Pickers, of which the following is a specification.

This invention relates to certain improvements in that class of fruit-pickers in which a fruit-detaching device is used in connection with a flexible chute which receives the fruit as detached, and conveys it to the operator who stands on the ground; and it consists in a further development of the invention described and claimed in Letters Patent No. 1,006,124 granted to me on the 17th day of October, in the year 1911 for a fruit-picker, and to which reference should be made.

The object of the present invention is to simplify the construction, and increase the efficiency of the device described in the said Letters Patent, as will hereinafter fully appear.

In the description of the said invention which follows, reference is made to the accompanying drawing, forming a part hereof, and in which:—

Figure 1 is a view illustrating the operation of the fruit-picker; and Fig. 2 an enlarged perspective view of the upper part of the device. Fig. 3 is a partly sectional side view, still further enlarged, of the upper part of the device; and Fig. 4 a perspective view of a portion of Fig. 3.

Referring now to the drawing, 1 is the pole or handle of the device, preferably of bamboo owing to its lightness, and which due to the difference in height of the trees from which fruit is to be picked, the pole is made in separable sections connected by ferrules *a*. The top of the pole is fitted with a band 2 formed of a piece of sheet metal rolled into volute form that is to say, with its ends lapped as shown in Fig 4 so as to constitute an expansible device which is always closed. This construction admits of using poles varying considerably in diameter at the upper end, with a standard sized band, which is a decided advantage.

Instead of using a plain circular hoop at the upper end of the pole, which in fruit gathering operation receives the fruit, together with a hand-operated vibratory detaching device to sever the fruit from its stem and cause it to fall by gravity to a chute, as shown and described in the said patent, I employ a practically circular wire hoop 3 having say, three points *b* which extend outwardly for a purpose hereinafter described. The ends of the wire forming the hoop 3 are brought together and passed downward through the clips *c* which are integral with the band 2, and then extended and formed into the ring 5 the function of which will hereinafter appear.

7 is a flexible chute formed of some soft textile fabric, the upper end of which is attached to the pointed hoop 3 at several places and generally by stitches. It will be understood that the wire ring 5 serves as a guard for the upper portion of the flexible chute and prevents the same being collapsed should it strike a branch of a tree; and as it projects laterally from the vertical portion of the wires immediately beneath the clips *c* of the extensible band 2, vertical movement of the band independently of the pole 1 is prevented without the employment of any additional means, thereby simplifying and cheapening the device. The chute is in sections attached together by buttons, or better by what are usually termed glove fasteners, in practically the same manner as that shown in the said patent; and it extends downward through the ring 5. The chute is connected to the pole 1 at several points by flexible rings or loops *d* which being considerably larger in diameter than the pole, admit of a freedom of motion of the chute independently of the pole which would not be the case should the connections be rigid. The lowest section of the chute is adapted for attachment to a bag 10, shown only in Fig. 1, preferably of canton flannel with the soft face inside, into which the fruit ultimately falls. The bag can be connected to any one of the sections of the chute which happens to be the lowest one.

The operation of gathering fruit by means of the present invention consists in first passing the hoop upward and over the fruit so that the same will be entirely within the chute, then drawing the device over laterally until the fruit is beneath one of the points of the hoop, and then drawing the device downward which places a strain on the fruit and causes its detachment from the tree. It then falls down the chute and can be caught near the bottom by temporarily clasping the same, or by allowing it to pass into the bag from which it can be removed through an opening formed by detaching the edge of the bag at one side of the chute proper.

I claim as my invention:—

In a fruit picker, a pole having at its upper end an expansible metal collar of volute form provided with clips which extend laterally therefrom, combined with a hoop formed of wire with outwardly extending points, the ends of which wire are brought together and passed through the clips and then extended to produce a ring, combined with a flexible chute attached at its upper end to the said hoop and extending downward through the ring, substantially as specified.

JOHN A. PINDELL.

Witnesses:
JULIA B. ROBINSON,
WM. T. HOWARD.

Copies of this patent may be obtained for five cents each, by addressing the " Commissioner of Patents, Washington, D. C."